No. 11,891. Reissued Feb. 26, 1901.

C. W. BECK.

ACETYLENE GAS GENERATOR.

(Application filed Jan. 3, 1901.)

2 Sheets—Sheet 1.

Witnesses,
F. G. Mann,
S. N. Pond.

Inventor,
Charles W. Beck,
By Offield Towler & Linthicum
Attys.

No. 11,891. Reissued Feb. 26, 1901.

C. W. BECK.

ACETYLENE GAS GENERATOR.

(Application filed Jan. 3, 1901.)

2 Sheets—Sheet 2.

Witnesses,

P. S. Mann,

S. N. Pond.

Inventor,

Charles W. Beck,

By Offield Towle & Linthicum

Att'ys.

UNITED STATES PATENT OFFICE.

CHARLES W. BECK, OF NEW YORK, N. Y., ASSIGNOR, BY DIRECT AND MESNE ASSIGNMENTS, TO THE ACETYLENE GENERATOR MANUFACTURING COMPANY, OF WEST VIRGINIA.

ACETYLENE-GAS GENERATOR.

SPECIFICATION forming part of Reissued Letters Patent No. 11,891, dated February 26, 1901.

Original No. 617,389, dated January 10, 1899. Application for reissue filed January 3, 1901. Serial No. 42,032.

*To all whom it may concern:*

Be it known that I, CHARLES W. BECK, a citizen of the United States, and a resident of New York, in the county of New York and State of New York, have invented certain new and useful Improvements in Acetylene-Gas Generators, of which the following is a specification.

This invention relates to improvements in acetylene-gas generators, and refers more specifically to an improved generator wherein the carbid is fed into a saturating-chamber in small graduated quantities at such frequent intervals and in such manner that the generation of gas is practically continuous.

Among the objects of the invention are to provide improved means for controlling the conflux of gas-generating elements, whereby the rate of generation is kept substantially equal to the rate of consumption and whereby the generation may be arrested almost instantly, thus avoiding waste and at the same time permitting the generator to be made very compact; to render such control or regulation automatic and dependent upon the consumption of the gas; to provide an improved feed mechanism for handling the pulverulent carbid, which is specially constructed to prevent access of the vapors caused by generation to the carbid and consequent clogging of the feed mechanism; to provide gas-regulating mechanism which will afford a more uniform pressure of gas at the burner, and to provide an apparatus of generally simplified, improved, and more effective construction which requires no special skill on the part of the operator in order to render its use safe and satisfactory.

The invention consists in the matters hereinafter described, and more particularly pointed out in the appended claims, and will be readily understood by reference to the accompanying drawings, in which—

Figure 1:
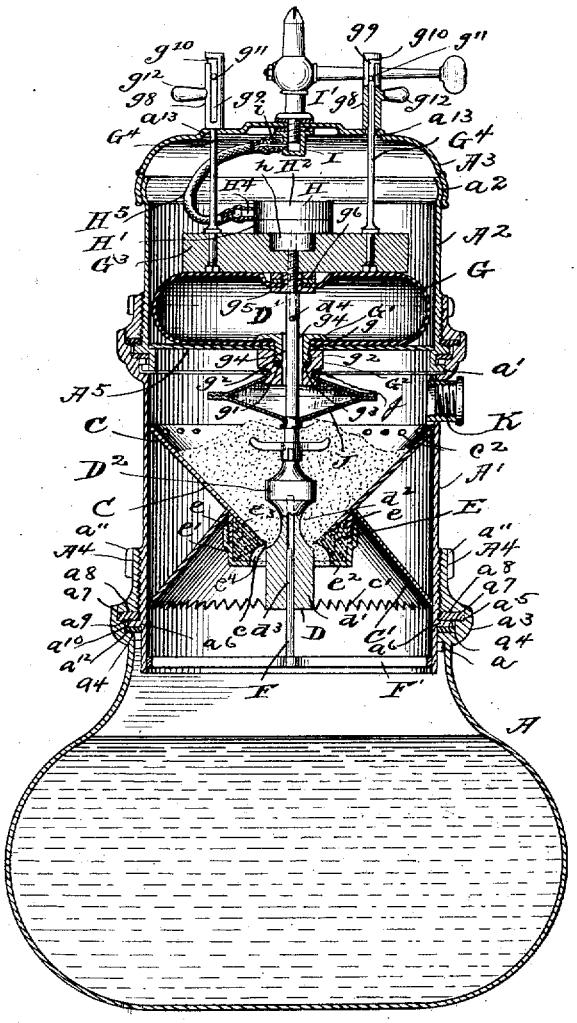
Figure 2:
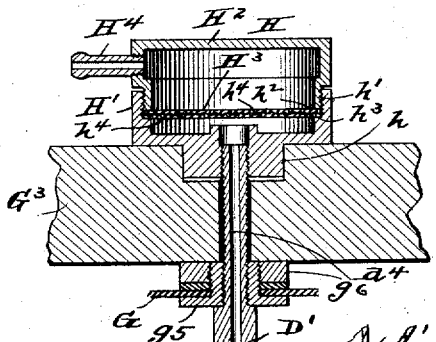
Figure 4:
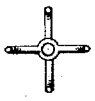
Figure 5:
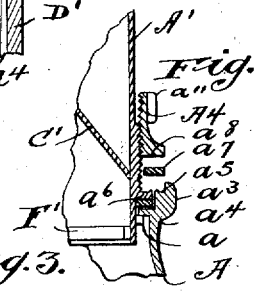
Figure 3:
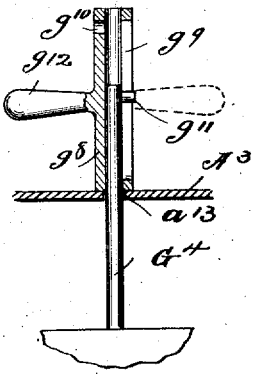

Figure 1 illustrates a preferred embodiment of my invention, the view being taken in axial section. Fig. 2 is an enlarged detail, also taken in axial section, of the gas-filter and connected parts. Fig. 3 is an enlarged sectional detail of one of the locking devices, whereby the feed mechanism of the generator may be secured in closed position. Fig. 4 is a plan view of the agitator applied to feed mechanism. Fig. 5 is an enlarged detail of one of the joints of the generator-casing, showing particularly the construction and arrangement of the packing devices.

Referring to the drawings, the generator is therein shown as consisting of three principal outer parts or sections, comprising a fount or base portion A, having somewhat the form of the base of a Florentine flask, (this form being adopted both in order to give the generator a symmetrical appearance and to afford a relatively large saturating-chamber,) a central section $A'$ of cylindric form and united at its lower end with the fount by means of an ordinary bayonet-joint $a$, and an upper section $A^2$, also of cylindric form, in the present instance of uniform diameter with the middle section $A'$ and also united with the latter by means of a bayonet-joint $a'$. The upper end of the upper section is closed by means of a cap $A^3$, herein shown as made of convex form and arranged to telescope at its lower edge over the upper end of the upper section, the said upper end being conveniently, as herein shown, swelled outwardly slightly or beaded, as at $a^2$, and the lower edge of cap correspondingly curved and arranged to spring over said bead, so as to hold the cover immovably in position.

In order to form a gas-tight joint at the points of juncture of the middle section with the fount and with the upper section, packing devices are provided, constructed and arranged as follows: The upper end of the fount, within which the lower end of the middle section telescopes, is provided with an annular enlargement $a^3$, within which are formed two steps or shoulders $a^4$ $a^5$, respectively, the former serving to support an annular horizontal projecting rib or flange $a^6$, formed upon the exterior of the middle section, and the latter being formed in a plane substantially on a level with the upper surface of said annular rib when the parts are assembled and serving, in conjunction with said rib, to form a seat for a packing-gasket $a^7$. $A^4$ designates a pressure-ring threaded upon the exterior of the middle section immediately above the annular rib thereof, the lower end of said ring being enlarged or made wide enough to form a compressing-face $a^8$, adapted to act upon the upper surface of the gasket to compress the latter against the seat formed by the rib and shoulder hereinbefore described. In order to insure a more perfect sealing of the joint by the packing-gasket, both the annular shoulder $a^5$ and the upper surface of the rib $a^6$ are provided with sharp ribs or knife-edges $a^9$ $a^{10}$, respectively, which sink into the gasket when the latter is forced against its seat, this particular construction being adopted in order to insure a gas-tight joint in case pulverized carbid or residue should get into said parts and prevent the gasket from resting closely against its seat. In order to afford a better hold for turning the pressure-ring, the latter is conveniently provided with outstanding lugs $a^{11}$, to which a spanner may be applied, if necessary, and in order to further insure a perfect sealing of the joint a packing-washer $a^{12}$ is inserted between the lower side of the rib $a^6$ and the shoulder $a^4$, which supports the rib. Inasmuch as the construction of the joint between the upper end of the middle section and the upper section is substantially identical with that last described, the description need not be repeated.

C designates a hopper-shaped carbid-receptacle arranged to occupy the upper part of the middle section, the funnel-shaped lower end of which terminates in a circular discharge-opening $c$, which is normally closed by a cylindrical plunger D, which is mounted upon an axially-arranged stem D′, so as to reciprocate normally through said discharge-opening.

The lower portion $d'$ of that part of the feed-plunger which reciprocates within the discharge-opening is made accurately cylindric throughout a part of its length, but is reduced in diameter and made of upwardly-tapering form immediately above this portion, as at $d^2$, so that as the plunger descends and carries the cylindric portion thereof entirely through the discharge-opening an annular feed-space will be opened of gradually-increasing area as the plunger descends. Immediately above the contracted portion of the feed-plunger last described is formed a second cylindric portion $D^2$ of the same diameter as the part D and located in such relation to the latter that when the plunger has been dropped to its lowermost position this part $D^2$ will be brought into register with the discharge-outlet, and thereby close the latter for a purpose to be hereinafter more fully explained.

In order to afford additional support and rigidity to the funnel-shaped lower end of the carbid-receptacle, an inverted funnel-shaped partition C′ is arranged within the lower part of the member A′, the upper end of which is secured to the hopper-bottom, while the lower end rests against and is secured to the inner surface of the outer casing. In order to afford free passage of gas upwardly from said support, the lower edge thereof is serrated, so as to form passages $c'$ between the points which are secured to the generator-body.

In order that vapors created by the generation of gas may not reach the carbid within the hopper through the discharge-outlet, and thus cause the pulverulent carbid to partially slake and adhere to the plunger in such manner as to clog or interfere with the operation of the feed, that part of the lower end of the hopper which forms the discharge-outlet is formed of relatively soft rubber or analogous material, as indicated at E, the discharge-aperture therethrough being made slightly smaller than the diameter of the feed-plunger, so that the latter forms a practically gas-tight closure when in position therein. The part E is shown as conveniently formed of a block of solid rubber, which is arranged to fit within a downwardly-opening cap $e$, secured to the under side of the hopper, and is held therein by means of a ring $e'$, threaded upon the cap and having an inturned flange $e^2$, which underlies the lower side of the rubber. In order that the friction between the rubber and feed-plunger may not be too great and that a clear discharge-opening may be formed when the plunger descends far enough to bring the conical portion thereof opposite the periphery of the opening, the upper surface of said rubber is formed in the same plane with or in continuation of the inner surface of the hopper, and the lower surface thereof, $e^4$, is arranged substantially at right angles thereto or made downwardly and outwardly flaring, as indicated clearly in the drawings. It will be obvious that with this construction if the rubber should become worn in course of time, so as to render the fit between itself and the plunger too open, it may be readjusted or the opening therethrough contracted by simply screwing up the compressing-ring $e'$ sufficiently to compress the rubber slightly.

The plunger is held and guided so as to reciprocate accurately through the discharge-opening by means of a guide-pin F, mounted upon a cross-support F′, extending across the lower end of the section A′, the plunger being provided with an axial bore $d^3$, which engages the guide-pin.

In order to reciprocate the feed-plunger so as to permit the carbid to escape automatically to the saturating-chamber and at the same time to provide means for receiving any surplus of gas which may be generated from the amount of carbid delivered upon any one reciprocation of the feed-plunger, means are provided as follows:

$A^5$ designates a horizontal partition secured permanently in the lower part of the upper member $A^2$ and provided centrally with an aperture $g$. G designates a collapsible gas-tight bag, preferably of soft rubber, arranged to rest upon said partition and having its lower side arranged to communicate with the opening therethrough conveniently and, as herein shown, by means of a hollow headed screw G′, the stem of which is passed downwardly through said opening $g$, while its head inside of the bag is arranged to clamp the latter securely against the partition around the said opening therein.

$G^2$ designates a hollow nut threaded upon the lower end of the screw G′ and provided with an internal annular shoulder $g'$, between which and the end $g^2$ of the screw is interposed a packing $g^3$. The hollow passage $g^4$, formed through the nut and screw, is of a diameter somewhat larger than the thickness of the stem D′ of the feed-plunger, and said stem is arranged to pass upwardly through the passage and through and beyond the opposite side of the gas-bag. At the point where said stem passes through the upper side of the bag it is positively secured to the latter, conveniently by means of a clamping screw and nut $g^5$ $g^6$, respectively, threaded upon the stem. At its extreme upper end the stem is provided with a small cylindrical box H, forming a gas-filter.

The reciprocation of the feed-plunger is effectuated by the alternate partial inflation and deflation of the gas-bag, and in order to provide a pressure which will tend to keep the gas-bag deflated and will maintain a substantially uniform flow of gas to the burner independent of the rate of generation a weight $G^3$ is arranged to rest upon the bag, said weight being herein shown as consisting of a thick circular disk, of lead or the like, which is conveniently held in position by means of the upper end of the plunger-stem, which is arranged to pass through a central aperture formed in the disk, the gas-filter hereinbefore mentioned serving as a clamping-nut to hold the disk clamped against the nut $g^6$.

$G^4$ designates a pair of guide-rods secured rigidly in vertical position to the weight $G^3$ and arranged to extend at their upper ends to the guide-apertures $a^{13}$, formed in the upper end cap of the generator and serving to guide the upper end of the feed-plunger stem in its reciprocation. Said guide-rods are also made to perform the function of locking devices, whereby the feed-plunger may be secured in raised position, so as to close the discharge-outlet of the hopper. To this end sleeves $g^8$ are mounted loosely upon the upper ends of said guide-rods, which are provided with a longitudinal slot $g^9$, having at its upper end an L-shaped portion $g^{10}$. $g^{11}$ designates studs or pins mounted upon the upper ends of the guide-rods and arranged to project outwardly through the slots of said sleeves. In the reciprocation of the guide-rods said studs are held freely within the vertical portions of the slots; but in case it be desired to lock the feed mechanism in a closed position the guide-rods are lifted so as to bring the right-angled portions of the slots opposite the studs, whereupon the sleeves are partially rotated, so as to carry the studs therein and support the mechanism in uplifted position. In order to facilitate the uplifting of the mechanism and rotation of the sleeves, the latter are each provided with a handle $g^{12}$, the operation of thus locking the mechanism being conveniently accomplished by first lifting one of the sleeves sufficiently to bring said guide-rod into contact with the bottom of the longitudinal slot and lift the feed mechanism sufficiently to permit the opposite sleeve being turned into locking position, whereupon this latter sleeve may be allowed to support the feed mechanism, while the opposite sleeve is also turned into locking position.

The filter H consists of two members H′ H², constructed separately in a horizontal plane about midway of the height of the box. The lower member H′ (see Fig. 2) is provided at its lower side with a centrally-apertured boss $h$, into which the upper end of the stem D′ is threaded and is internally screw-threaded at its upper end, as at $h'$, to receive the externally-threaded lower end of the upper member H², an internal annular shoulder $h^2$ being formed at the lower end of the internally-screw-threaded portion, which forms a seat upon which the periphery of the filter-diaphragm $H^3$ rests and is clamped by the lower end of the upper member. Said diaphragm may be of any suitable gas-filtering material, that shown in the present instance consisting of a sheet of wire-gauze $h^3$, interposed between two more sheets of fibrous woven cloth $h^4$. An outlet-nipple $H^4$ is provided at one side of the upper member, with which is connected a flexible pipe $H^5$, preferably of rubber, and the opposite end of which is connected with a similar nipple $i$, formed or secured upon the hollow cap-shaped nut I, which is threaded upon the lower end of the burner-nozzle I′, the latter being seated upon the cover or cap $A^5$ and having its lower end arranged to project downwardly through the latter.

In order to provide a passage of the gas from the gas-bag to the filtering-chamber, the upper part of the stem D′ is made hollow, as indicated at $d^4$, Fig. 2, and a transverse inlet-aperture $d^5$ is formed to communicate with the bore $d^4$ at a point within the gas-bag.

In order that the gas which is generated in the saturating-chamber may be caused to pass over or through the carbid contained in the hopper, and thus owing to the hygroscopic character of the carbid to a great extent dry the gas, the hopper is provided, near the top of the funnel-shaped portion thereof, with a plurality of inlet-apertures $c^2$. From the upper part of the hopper the gas passes upwardly through the hollow nut $G^2$ into the gas-bag.

In order to prevent the dust and pulverized carbid from passing from the hopper up into the gas-bag and at the same time provide a construction which will not interfere with the free movement of the feed-plunger, a closely-woven or felted cloth bag J is arranged to surround said stem immediately below the hollow screw-plug G', one side of said bag being tied or otherwise secured around a circumferential groove *j*, formed in the lower end of the nut $G^2$, while the opposite side of the bag is similarly secured to the stem of the feed-plunger at a point sufficiently below the said nut to permit the necessary movement of the stem. It will be understood that the gas will pass freely through the bag J, but that the dust and carbid will be effectually excluded.

The operation of the apparatus thus described will be obvious from the foregoing description, but may be briefly outlined as follows: The fount having been separated from the remainder of the generator and suitably charged with water and a suitable quantity of pulverized carbid having been charged into the hopper through the screw-cap-closed inlet K, the parts are reunited, the compression-ring turned down, so as to insure a gas-tight joint, and the generator is in readiness for operation. The generator may be started by simply opening the cock, unlocking the feed mechanism, and lowering the feed-plunger gradually until the carbid begins to escape through the discharge-opening and fall into the water, whereupon a volume of gas will be instantly generated which will inflate the gas-bag and prevent the further descent of the feed-plunger, which may then be released. The jet may now be ignited, and the feed mechanism will automatically regulate the rate of feed, the feed-plunger descending as the gas-bag deflates until a small quantiy of carbid has been discharged into the liquid, whereupon the pressure will rapidly reinflate the bag, and thereby shut off the feed. The size of the jet desired may be regulated by simply turning on or off the gas-cock, it being obvious that the more slowly the gas is allowed to escape through the burner the more slowly the pulverized carbid will be fed to the saturating-chamber.

It is found in practice that the amount of carbid discharged at one time is never sufficient to generate more gas than the bag will accommodate, so that the gas may be turned off to extinguish the burner with impunity and the generator will remain for any length of time ready for instant reignition.

It is found in practice that the yielding rubber which forms the discharge-opening of the hopper and through which the feed-plunger reciprocates effectually prevents the vapor from reaching the carbid in the lower part of the hopper, and thus prevents it from partially slaking and sticking to the feed-plunger or adjacent parts. This is a feature of much importance.

Should the gas-bag by any chance be arrested or spring a leak, the plunger would immediately drop far enough so that the uppermost cylindric portion thereof would be brought into register with and close the discharge-opening. The small amount of gas generated from the carbid discharged in the downward movement of the plunger would simply escape through the gas-bag and thence out through the guide-apertures $a^{13}$.

While I have herein shown a practical and preferred construction, yet it will be understood that the details thereof may be modified to a certain extent without departing from the spirit of the invention and without the exercise of more than ordinary mechanical skill.

I claim as my invention—

1. A feed mechanism for feeding pulverulent carbid and the like, comprising a carbid-receptacle provided with a discharge-orifice, the periphery of which is formed of yielding material, and a feed-plunger having a portion of uniform cross-sectional area adapted to form a liquid-tight closure for said orifice and arranged to reciprocate through the latter.

2. A feed mechanism for feeding pulverulent carbid and the like, comprising a carbid-receptacle provided with a discharge-orifice, the periphery of which is formed of yieldable material which is impervious to liquid, a feed-plunger having a portion of substantially uniform cross-sectional area adapted to form a liquid-tight closure for said orifice, arranged to reciprocate through the latter, and means operable by pressure of gas generated arranged to automatically reciprocate the feed-plunger.

3. In a feed mechanism for feeding pulverulent carbid and the like, the combination of a carbid-receptacle provided with a discharge-orifice formed through a body of relatively soft rubber, a feed-plunger having a portion of uniform cross-sectional area adapted to fit closely within and reciprocate through said orifice, and means operable by pressure of gas generated, arranged to automatically reciprocate the feed-plunger.

4. In a feed mechanism for feeding pulverulent carbid and the like, the combination of a carbid-receptacle provided with a discharge-orifice formed through a body of relatively soft rubber, the portions of the rubber forming the periphery of said orifice being brought to a blunt edge, a feed-plunger having a portion of uniform cross-sectional area adapted to fit closely within and reciprocate through said orifice, and means operable by pressure of gas generated, arranged to automatically reciprocate the feed-plunger.

5. In a feed mechanism for feeding pulverulent carbid and the like, the combination of a carbid-receptacle provided with a discharge-orifice formed through a body of relatively soft rubber, the portions of the rubber forming the periphery of said orifice being brought to a blunt edge, means for compressing the body of rubber so as to reduce the diameter of the orifice therethrough, a feed-plunger having a portion of uniform cross-sectional area adapted to fit closely within and reciprocate through said orifice, and means operable by pressure of gas generated arranged to automatically reciprocate the feed-plunger.

6. In a feed mechanism for feeding pulverulent carbid and the like, the combination of a hopper provided with a funnel-shaped bottom, the lower end portion of which is formed of a body of rubber provided at its center with a discharge-orifice, an inverted-cup-shaped receptacle upon the lower end of the hopper within which the said body of rubber is seated, and a clamping-ring threaded upon said receptacle provided with an inturned flange adapted to hold the rubber compressed within the receptacle.

7. The combination with a gas-generator comprising separable parts, of means for forming a gas-tight joint at the point of separation comprising a bayonet-joint adapted to lock said members together, an internal annular shoulder formed upon the embracing member, an annular rib formed upon the telescoping member, the upper surface of which is arranged to lie in substantially the same plane with said annular shoulder so as to form in conjunction with the latter a gasket-seat, a gasket arranged to rest upon said seat, and a clamping or compressing ring threaded upon the telescoping member above the said rib and provided with a compressing-face adapted to act upon the gasket.

8. The combination with a gas-generator comprising separable parts, of means for forming a gas-tight joint at the point of separation, comprising a bayonet-joint adapted to lock said members together, an internal annular shoulder formed upon the embracing member, an annular rib formed upon the telescoping member, the upper surface of which is arranged to lie in substantially the same plane as said annular shoulder so as to form in conjunction with the latter a gasket-seat extending on each side of the line of separation of the members, a circumferentially-complete upstanding, knife-edged bead formed upon each portion of said gasket-seat, a gasket arranged to rest upon said seat, and a clamping or compressing ring threaded upon the telescoping member above the said rib and provided with a compressing-face adapted to act upon the gasket.

9. In a feed mechanism for feeding pulverulent carbid and the like, the combination of a carbid-receptacle provided with a discharge-orifice, the periphery of which is formed of yielding material, a feed-plunger having a portion of uniform cross-sectional area adapted to fit within said orifice, a recess above the portion of uniform cross-sectional area, a second portion above said recess adapted to fit within and occupy the discharge-orifice, and means for positively arresting the descent of the plunger when the latter is in position for its portion above the recess to register with the discharge-orifice.

10. In a feed mechanism for feeding pulverulent carbid and the like, the combination of a carbid-receptacle provided with a discharge-orifice, a feed-plunger having a portion of uniform cross-sectional area adapted to fit within and reciprocate through the orifice, a second portion of uniform cross-sectional form with the first-mentioned portion located at a distance above the latter, an intervening annular recess or reduced part, an expansible gas-receptacle adapted to receive the gas generated from carbid fed through the discharge-orifice, and means operatively connecting the feed-plunger with the expansible gas-receptacle whereby the lower portion of the plunger will be caused to operate as a feed-valve in the normal inflation and deflation of the expansible receptacle, and the upper portion of the feed-plunger will be caused to act as a stopper for the discharge-orifice when the expansible receptacle is deflated to its greatest extent.

11. In an acetylene-gas generator the combination of a carbid-receptacle and an expansible gas-receptacle, an inlet arranged to admit gas to the carbid-receptacle and an outlet to permit the gas to escape therefrom to the expansible gas-receptacle, a reciprocatory part extending through the wall separating the carbid and gas receptacles and means for preventing the passage of pulverulent carbid from the carbid-receptacle to the gas-receptacle while permitting free passage of the gas and free movement of the reciprocatory part, consisting of a flexible gas-filtering bag through which said reciprocatory part, is arranged to extend, one side of the bag being secured closely around and embracing the reciprocatory part and the opposite side being secured to the wall separating the carbid and gas receptacles around the passage therein through which the reciprocatory part extends.

12. A gas-filter, comprising a pair of cap-shaped receptacles screw-threaded to fit together at a point intermediate of the depth of the receptacle, an internal annular shoulder formed upon the embracing member with which the end margin of the telescoping member is adapted to coact, a filter consisting of a plurality of sheets of fibrous material and an interposed sheet of wire-gauze or foraminated metal, the whole forming a horizontally-arranged diaphragm the periphery of which is clamped between the annular shoulder and coacting end of the opposing member, inlet and outlet apertures formed in the two members, respectively, and an annular rib or flange surrounding the aperture, whereby the filtrate is prevented from entering said aperture.

13. In an acetylene-gas generator the combination with a feed mechanism and an expansible gas-receptacle with which the feed mechanism is connected, of a guide-rod connected with said feed mechanism and arranged to extend upwardly through the generator-casing, and means for locking the guide-rod immovably in position to hold the feed mechanism closed, comprising a sleeve within which the upper end of the guide-rod is arranged to telescope, a longitudinal slot formed in said sleeve, and an offset or angular slot portion communicating with the longitudinal slot and forming a retaining-shoulder, and a stud mounted upon the guide-rod and arranged to reciprocate within said slot, one of said parts being free to rotate so as to carry the stud into the angular portion of the slot.

14. In an acetylene-gas generator, the combination with a feed mechanism and an expansible gas-receptacle with which the feed mechanism is connected, of a pair of parallel guide-rods connected with said feed mechanism and arranged to extend upwardly through the generator-casing, and means for locking said guide-rods immovably in position to hold the feed mechanism closed, comprising a sleeve loosely mounted upon the upper end of each guide-rod and provided with a longitudinal slot having an offset or angular portion at its upper end, studs inserted in said guide-rods and arranged to protrude through the slots of the respective sleeves, and handles upon the sleeves whereby the latter may be lifted and rotated upon their respective guide-rods.

15. The combination to form an acetylene-gas generator, of the three-part generator-casing comprising the fount or base forming the saturating-chamber, the intermediate section detachably connected with the fount and within which are arranged the carbid-hopper and feed-plunger, the upper section detachably connected with the intermediate section and having in its lower end the horizontal partition, the gas-bag arranged to rest upon said partition, the weight arranged to rest upon said gas-bag, the stem connected with the feed-plunger and arranged to extend upwardly through the gas-bag and connected with the weight resting thereon, and the flexible gas-pipe connected at one end with the burner-nozzle and arranged to communicate at its other end with the gas-bag, substantially as described.

16. The combination to form an acetylene-gas generator, of the three-part generator-casing comprising the fount or base forming the saturating-chamber, the intermediate section detachably connected with the fount and within which are arranged the carbid-hopper and feed-plunger, the upper section detachably connected with the intermediate section and having in its lower end the horizontal partition, the elastic gas-bag arranged to rest upon said partition, the weight arranged to rest upon said gas-bag, the stem connected with the feed-plunger and arranged to extend upwardly through the gas-bag and connected with the weight resting thereon, the dust-filtering bag embracing the stem within the carbid-receptacle and arranged to prevent access of dust to the gas-bag, the filter-box mounted upon the upper end of the feed-plunger stem and communicating with the gas-bag through the hollow feed-stem, and the flexible gas-pipe connected at one end with the outlet of the filter-box and at its opposite end with the burner-nozzle.

17. In an acetylene-gas generator, the combination of a saturating-chamber, a carbid-receptacle provided with a downwardly-converging bottom mounted above said chamber, means for intermittently discharging controlled quantities of carbid into the saturating-chamber, an annular gas-chamber interposed between the carbid-receptacle and saturating-chamber around the communicating passage therebetween, and reduced inlet and outlet apertures admitting the gas from the saturating-chamber to the annular gas-chamber and thence to the carbid-receptacle.

18. A feed mechanism for feeding pulverulent carbid and the like, comprising a carbid-receptacle having a discharge-orifice constituting a valve-port, a feed-plunger working into and controlling said port, the valve stopper or plunger portion proper whereof is of larger size than the normal size of the port, one of said coöperating valve members having a yieldable seating portion with which the opposite member moves relatively into rubbing contact, for the purposes set forth.

19. A feed mechanism for feeding pulverulent carbid and the like, comprising a carbid-receptacle having a discharge-orifice constituting a valve-port, a feed-plunger working into and controlling said port, the valve stopper or plunger portion proper whereof is of larger size than the normal size of the port, one of said coöperating valve members having a yieldable seating portion with which the opposite member moves relatively into rubbing contact and whereby it is distorted, for the purposes set forth.

CHARLES W. BECK.

Witnesses:
JAS. R. CRAWFORD,
WM. E. MCANDREWS.